Patented July 29, 1952

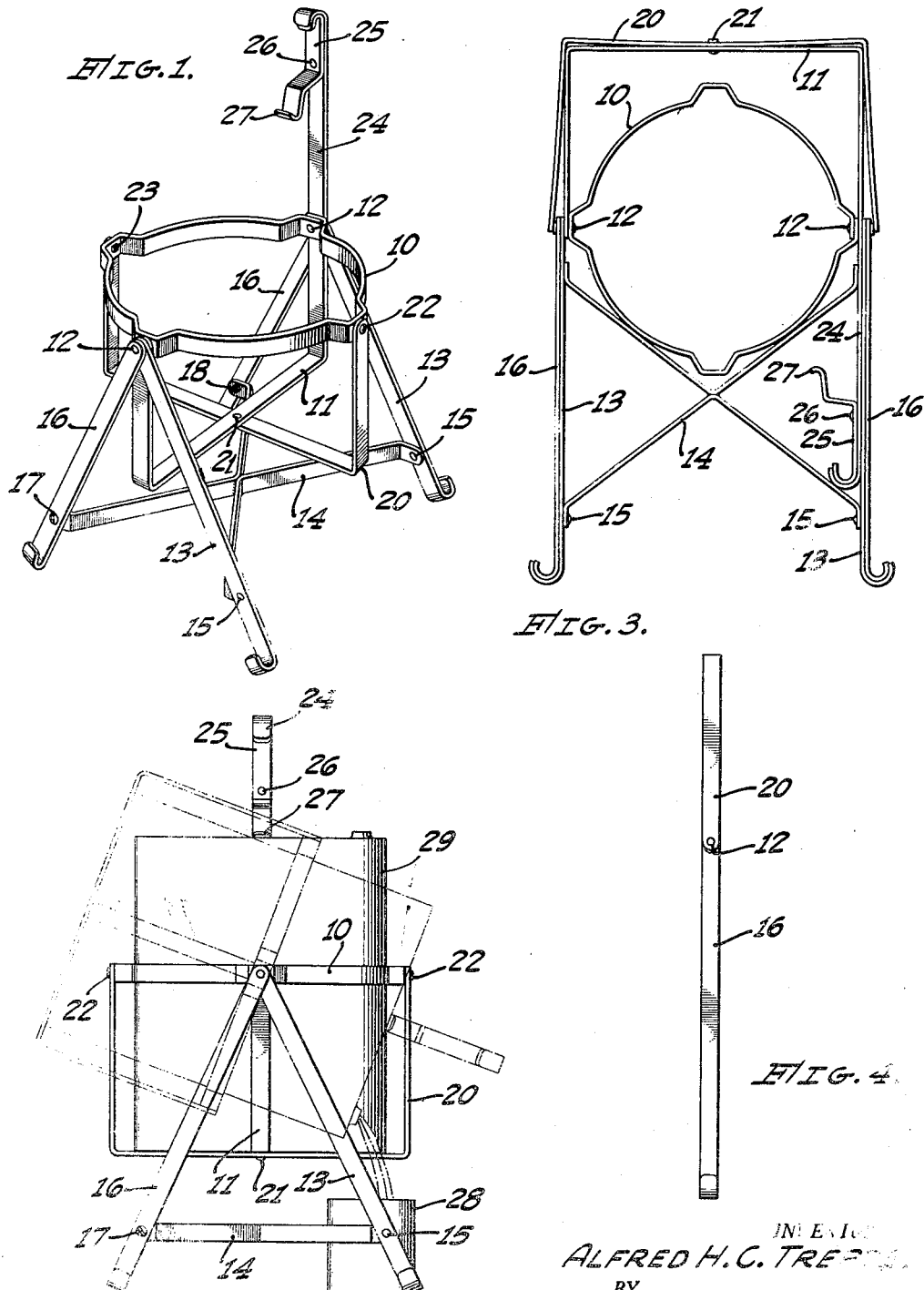

2,605,071

UNITED STATES PATENT OFFICE 2,605,071

COLLAPSIBLE DISPENSING RACK

Alfred H. C. Trepte, Los Angeles, Calif.

Application January 12, 1948, Serial No. 1,711

6 Claims. (Cl. 248—136)

This invention relates to a collapsible rack for holding containers to dispense the contents thereof.

An object of this invention is to provide a collapsible rack having a stand and a container receiving frame which is swingable on the stand, the stand and the container receiving frame being completely collapsible into a single plane without the necessity of removal of the container receiving frame from the stand.

Another object of this invention is to construct a rack having a stand having legs and a container receiving frame tiltably mounted on the stand, with the stand so constructed that the space between opposite legs is clear whereby when a container in the frame is being tilted to dispense the contents thereof a second container may be placed on the floor between the legs of the stand thereby eliminating the necessity of the operator holding the second container while tilting the container receiving frame.

Another object of this invention is to provide a container holding rack having a stand and a tiltable container receiving frame on the stand and the frame having a tilting arm with a hand grasping portion on the arm so that the contents of the container may be dispensed quickly and safely by grasping the arm and tilting the container receiving frame.

Another object of this invention is to provide a can holding rack having a tiltable container receiving frame having an upstanding hand grasping arm with a container clamping lever pivoted to the hand grasping arm and engageable therewith in its clamping position to insure that the can clamping lever will be positively held in its clamping position.

With the foregoing and other objects in view, which will be made manifest in the following detailed description and specifically pointed out in the appended claims, reference is had to the accompanying drawings for an illustrative embodiment of the invention, wherein:

Fig. 1 discloses a perspective view of the collapsible rack in its erected position;

Fig. 2 is a side elevation view of the collapsible rack showing a container being contained within the rack and clamped within the rack and showing in dot-dash position the can being tilted to dispense the contents thereof;

Fig. 3 is a front elevation view of the collapsible rack in its collapsed condition; and Fig. 4 is a side elevation view of the collapsible rack in its collapsed condition.

Referring to the accompanying drawings wherein similar reference characters designate similar parts throughout, the collapsible rack of this invention is shown as adapted to receive a can but the invention is not limited to can holding racks but may be adapted to any kind of container. The collapsible rack for holding cans or the like comprises a can surrounding member 10 having a can supporting member 11 depending therefrom and pivoted thereto at opposite sides thereof by means of pivots 12. Inner legs 13 of the stand are pivoted to the can supporting member 11 at pivots 12 and have opposite ends of an X brace 14 pivoted to the lower ends thereof at 15. Outer legs 16 for the stand are pivoted to the inner legs at pivots 12 and adapted when spread with respect to the inner legs to be detachably connected to the other opposite ends of the X brace 14 by means of screws 17 and nuts 18. A second can supporting member 20 is pivoted to the first can supporting member 11 at 21 and detachably connected to the can surrounding member 10 by means of screws 22 and nuts 23.

Can supporting member 11 has an upstanding arm 24 at one side thereof, the upper end of said arm being rearwardly curved to form a hand grasping portion although, of course, any type of grasping portion may be formed on upstanding member 24 or attached thereto. A can clamping lever 25 is pivoted to hand grasping arm 24 at 26 and has the lower end thereof bent outwardly and downwardly and outwardly again to form a foot 27 and the upper end of lever 25 may be so reversely bent so as to snapingly engage the upper curved portion of hand grasping arm 24. It will be seen from Fig. 2 that the clamping lever 25 may be swung outwardly to permit a can to be placed in the can containing frame and then swung back so that the foot 27 presses down upon the top of the can and firmly holds the can within the can holding frame. As the can clamping lever 25 is constructed with the upper end curved, as shown in Fig. 1, the clamping lever will snap into engagement with the upstanding member when in the position shown in Figs. 1 and 2. The can clamping lever 25 may be constructed without such a locking device and will without the locking device securely clamp a can within the can containing frame, but if the snapping engagement with the upstanding member 24 is provided the construction insures that the can clamping lever will not accidentally be knocked out of place.

In prior racks, the space between the legs was obstructed by parts of the rack and it was necessary for the operator to tilt the rack while holding a container which receives the contents of the container in the rack. It will be seen from Figs 1 and 2 that the space between the opposite legs of the rack of the present invention is free from obstructions and parts of the rack so that a container designated 28 in Fig. 2 may be placed on the floor or ground between the inner legs 13 or outer legs 16 and the contents of a container 29 in the rack may be quickly and easily dispensed into the container on the floor without any chance of spilling the contents being dispensed.

When it is desired to transport or store the collapsible rack of the present invention, the screws 17 and 22 and nuts 18 and 23 may be removed and the upstanding arm 24 swung in an arc of approximately 180°, as shown in Fig. 3, after which, the can supporting member 20, being detached from the can surrounding member 10, may be pivoted approximately 90° to the position shown in Fig. 3 and slightly sprung over the pivots 12. The X brace 14, which is detached from the outer leg 16, may be swung up between inner legs 13, as shown in Fig. 3, and the outer leg 16 swung over the inner legs 13, as shown in Fig. 3, whereby the collapsible rack is completely collapsed into a single plane.

It will be appreciated that in constructing a collapsible rack which is completely collapsible into a single plane that storage and transportation problems are greatly lessened since the collapsible racks can be easily stacked on one another or maneuvered into small places and consume very little space and when it is desired to erect the rack this is accomplished quickly and easily with only the necessity of applying four screws and four nuts.

The X brace 14 and the can supporting member 20 are connected to the other parts of the rack by means of screws and nuts but the invention is not limited to this particular type of connection since it is obvious that the parts may be formed or means provided so that instead of screws and nuts the parts merely snap together when moved to the erected position.

The portions of inner legs 13 and outer legs 16 may be curved upwardly, as shown in the drawings, to afford better bearing surfaces for the collapsible rack and, if so, it is preferred that the bottom portions of inner legs 13 be so curved up shorter than the bottom portions of the outer legs 16 that when the leg is collapsed the curved portions of the inner legs 13 will snap into and nestle within the lower curved portions of the outer leg 16, as shown in Fig. 3, so that the collapsible rack is collapsed into a single plane, as shown in Fig. 4, and positively held in this position by the engagement of the curved portions of the legs.

The can surrounding member 10 may be formed, as shown in Figs. 1 or 2, so that either square cans or containers or round cans or containers or other shaped cans or containers may be placed within the rack.

Although the lever 25 is shown as adapted to clamp a can within the cage, the lever may be formed so as to hold a bottle or may be adapted to any type container or another upstanding member 24 may be provided opposite the single upstanding member shown in the drawings and resulting in two levers 25 and the levers or other devices provided on these upstanding arms to retain bottles, cans or other containers within the cage without departing from the scope of the invention. With such a construction, the collapsible rack would still be completely collapsible into a single plane.

A removable bottle holder or can holder may be provided on the cage and when it is desired to collapse the rack this removable can holder or bottle holder or holder which is adapted to hold different types of containers within the cage may be removed and the rack collapsed.

Various changes may be made in the details of construction without departing from the spirit and scope of the invention as defined by the appended claims.

I claim:

1. A collapsible frame for holding containers or the like, comprising an X brace, pairs of legs arranged at opposite sides of the X brace, the legs of each pair of legs being pivoted together near their upper ends, the inner legs being pivoted near their lower ends to opposite ends of the X brace, the outer legs being detachably connected near their lower ends to their other opposite ends of the X brace so that when connected a sturdy stand is provided, and when disconnected, the X brace may be collapsed within the inner legs and the inner legs collapsed within the outer legs, a collapsible cage for containing a container or the like pivoted to the stand and comprising an upper member adapted to surround a container therein, a member depending therefrom and having a portion adapted to be arranged beneath the container, and a second depending member removably secured to said upper member having a portion adapted to be arranged beneath the container and connected to the lower portion of the second mentioned member, whereby the cage may be collapsed and the parts arranged in a single plane, said second named member having an arm extending upwardly therefrom and forming a hand grasping portion at its top to enable the cage to be tilted and the contents of the can dispensed, and a locking member pivoted to the arm having a foot adapted to bear on the top of a container to clamp the container within the cage.

2. A rack for holding containers or the like, comprising a supporting stand, a container receiving frame pivoted within the stand for oscillatory movement thereabouts, said container receiving frame having upwardly extending arm enabling the container receiving frame to be oscillated and a container holding means pivotally mounted on the arm and adapted to be moved to a position so as to retain a container within the container receiving frame, said arm and said holding means having cooperating locking portions so that when the holding means is moved to retain a container within the container receiving frame, the cooperating portions cooperate to hold the arm and the holding means from movement relative to one another.

3. A rack for holding containers or the like, comprising a supporting stand, a container receiving frame rotatably mounted on said supporting stand, said container receiving frame having an upwardly extending arm enabling the container receiving frame to be tilted to dispense the contents of the container, and a locking member pivoted to said arm and swingable about a horizontal axis, said locking member having a foot adapted to bear against the top of the container to hold the container within the container receiving frame, said locking member and said arm having interlocking interengaging elements formed integrally therewith adapted to cooperate for locking the frame when a foot is bearing on a container.

4. A collapsible frame for holding containers or the like comprising opposed pairs of legs, a pivot pin for each pair of legs, the legs for each pivot pin being pivoted thereon, the legs of each pair of legs being swingable to a spread-apart position and therefrom to a collapsed position where the legs of each pair of legs are nestled together in complete overlapping relationship, an X-brace pivoted to the inner legs and detachably connected to the outer legs when the legs are spread apart to provide a stand, the X-brace when detached from the outer legs being swingable to a vertical position between the legs, the inner legs and the outer legs having interengaging portions thereon which engage to lock the legs in collapsed position when the legs are swung together, a container surrounding member pivoted on said pivot pins and swingable to a vertical collapsed position and therefrom to a substantially horizontal position, and means depending from the container surrounding member adapted to support a container, the last named means being collapsible.

5. A collapsible frame for holding containers comprising a container-surrounding member, a container-supporting member extending diametrically thereacross and pivotally connected thereto at its opposite sides, a second container-supporting member pivotally mounted at its center to the center of the first container-supporting member and detachably connected at its ends to the container-surrounding member, pairs of legs pivotally connected to each other and to each pivotal connection between the container-surrounding member and the first-mentioned container-supporting member adapted to assume spaced set-up positions or collapsed positions in alignment with each other, and an X-brace pivotally connected to one leg of each pair and detachably connected to the other leg of each pair.

6. A collapsible frame for holding containers comprising a container-surrounding member, a container-supporting member extending diametrically thereacross and pivotally connected thereto at its opposite sides, a second container-supporting member pivotally mounted at its center to the center of the first container-supporting member and detachably connected at its ends to the container-surrounding member, pairs of legs pivotally connected to each other and to each pivotal connection between the container-surrounding member and the first-mentioned container-supporting member adapted to assume spaced set-up positions or collapsed positions in alignment with each other, an X-brace pivotally connected to one leg of each pair and detachably connected to the other leg of each pair, one side of the first-mentioned container-supporting member extending upwardly beyond the container-surrounding member, and a container-retaining lever pivotally mounted upon the extension adapted to engage a container placed within the container-surrounding member and supported by the container-supporting members.

ALFRED H. C. TREPTE.

REFERENCES CITED

The following references are of record in the file of this patent:

UNITED STATES PATENTS

| Number | Name | Date |
|---|---|---|
| 1,453,547 | Culver et al. | May 1, 1923 |
| 1,580,098 | Berger | Apr. 6, 1926 |
| 1,609,207 | Schlabaugh | Nov. 30, 1926 |
| 2,240,395 | Evans | Apr. 29, 1941 |

FOREIGN PATENTS

| Number | Country | Date |
|---|---|---|
| 258,680 | Great Britain | Sept. 29, 1926 |